United States Patent
Shalev et al.

(10) Patent No.: US 9,084,042 B2
(45) Date of Patent: Jul. 14, 2015

(54) APPARATUS AND METHOD FOR LONG PLAYBACK OF SHORT RECORDINGS

(71) Applicant: Elli&Nooli, llc, Los Angeles, CA (US)

(72) Inventors: Maya Shalev, Yehuda (IL); Amos Shaham, Yehuda (IL)

(73) Assignee: Elli&Nooli, LLC, Los Angeles, CA (US)

( * ) Notice: Subject to any disclaimer, the term of this patent is extended or adjusted under 35 U.S.C. 154(b) by 268 days.

(21) Appl. No.: 13/796,999

(22) Filed: Mar. 12, 2013

(65) Prior Publication Data

US 2013/0308811 A1 Nov. 21, 2013

Related U.S. Application Data

(60) Provisional application No. 61/647,595, filed on May 16, 2012.

(51) Int. Cl.

| H04R 1/02 | (2006.01) |
| H04R 9/06 | (2006.01) |
| H04M 1/64 | (2006.01) |
| H04R 3/00 | (2006.01) |
| H04M 11/10 | (2006.01) |

(52) U.S. Cl.
CPC .. H04R 1/02 (2013.01); H04R 3/00 (2013.01); H04M 11/10 (2013.01)

(58) Field of Classification Search
CPC ......... H04M 1/64; H04M 1/642; H04M 1/65; H04M 1/6505; H04M 1/652; H04M 3/533; H04M 11/005; H04M 11/10; H04M 2203/30; H04M 2203/301; H04M 2203/305; G10D 7/023; H04R 1/02; H04R 3/00; H04R 9/12; H04R 9/16; H04R 11/08; H04R 11/12; H04R 17/04; H04R 17/08; H04R 19/06; H04R 19/10; H04R 21/04; H04S 2400/15
USPC .................. 381/77, 334; 379/67.1, 68, 88.22, 379/88.23, 88.26, 373.05
See application file for complete search history.

(56) References Cited

U.S. PATENT DOCUMENTS

| 3,673,332 | A | * | 6/1972 | Muller et al. .................... 379/74 |
| 3,872,254 | A | * | 3/1975 | Murata et al. ................... 379/77 |
| 4,017,905 | A | * | 4/1977 | Convertine et al. ............. 360/90 |
| 4,436,959 | A | * | 3/1984 | Nakatsuyama et al. ........ 379/73 |
| 4,640,034 | A | | 2/1987 | Zisholtz |
| 4,734,929 | A | * | 3/1988 | Hashimoto ..................... 379/81 |
| 4,959,852 | A | * | 9/1990 | Kern et al. ...................... 379/70 |
| 5,184,971 | A | | 2/1993 | Williams |
| 5,279,514 | A | * | 1/1994 | Lacombe et al. ............. 446/297 |
| 5,468,172 | A | | 11/1995 | Basile |
| 5,471,009 | A | * | 11/1995 | Oba et al. ........................ 84/645 |
| 5,489,231 | A | | 2/1996 | Leyser |
| 5,803,786 | A | | 9/1998 | McCormick |
| 5,973,250 | A | * | 10/1999 | Zirille et al. .................... 84/600 |
| 6,193,580 | B1 | * | 2/2001 | Albert et al. .................. 446/297 |

(Continued)

*Primary Examiner* — Khai N Nguyen
(74) *Attorney, Agent, or Firm* — K&L Gates LLP

(57) ABSTRACT

A method and apparatus for providing long playback of short recordings are disclosed. An example method includes recording audio for a time period that is less than a maximum recording time, receiving an indication that the audio is to be played back, playing the audio back for a duration corresponding to the time period, determining the audio is to be repeated, and responsive to determining that the audio is to be repeated, at the end of the time period duration, playing the audio back multiple times for a preset time or preset number of repetitions.

19 Claims, 4 Drawing Sheets

(56) References Cited

U.S. PATENT DOCUMENTS

| | | |
|---|---|---|
| 6,196,893 B1 | 3/2001 | Casola et al. |
| 6,226,533 B1 * | 5/2001 | Akahane ............... 455/566 |
| 6,354,842 B1 * | 3/2002 | Frei ...................... 434/365 |
| 6,520,776 B1 * | 2/2003 | Furukawa ............. 434/307 A |
| 6,524,157 B1 | 2/2003 | Ryan |
| 6,832,039 B1 | 12/2004 | Nami |
| 8,229,582 B1 * | 7/2012 | Ireland .................. 700/94 |
| 8,364,017 B2 | 1/2013 | Ohtake et al. |
| 2002/0106621 A1 * | 8/2002 | Godley ................. 434/319 |
| 2003/0041494 A1 * | 3/2003 | Yucht .................... 40/617 |
| 2007/0038318 A1 * | 2/2007 | Sakata ................... 700/94 |
| 2007/0202849 A1 * | 8/2007 | Moeller ................. 455/412.1 |
| 2008/0199015 A1 * | 8/2008 | Okko .................... 381/56 |
| 2010/0307036 A1 * | 12/2010 | Lien et al. ............. 40/124.03 |
| 2011/0034102 A1 * | 2/2011 | Fong et al. ............ 446/175 |
| 2011/0034103 A1 * | 2/2011 | Fong et al. ............ 446/297 |
| 2011/0195632 A1 | 8/2011 | Chow |
| 2011/0281652 A1 * | 11/2011 | Laverdiere ............ 463/37 |
| 2012/0185547 A1 * | 7/2012 | Hugg et al. ........... 709/206 |

* cited by examiner

APPARATUS AND METHOD FOR LONG PLAYBACK OF SHORT RECORDINGS

CROSS REFERENCES TO RELATED APPLICATIONS

The present application claims priority to and the benefit of U.S. Provisional Patent Application No. 61/647,595, filed on May 16, 2012, the entirety of which is incorporated herein by reference.

BACKGROUND

Current prerecorded plush toys may be used as sleeping accessories or crib mobiles for babies. Known plush toys have several tunes prerecorded. A user can select to play any one of the prerecorded tunes. Other known plush toys may include a simple record/play function. There are also recordable books, although they are not meant to be used as sleeping plush accessories, and are made for children rather than babies. Recordable books allow one story to be recorded, and the story will not replay on a loop.

Certain known recordable plush toys require a USB cable and an Internet connection to download music or record audio to the plush toy. These toys do not repeat the recording. Others toys may allow looping of a recording, but the looping can only playback a set amount of times. For example, the recording to be looped may be required to be 20 seconds long, and any recording shorter than that will playback with silence comprising the remainder of the 20 seconds. Other recordable plush toys can record for up to a certain time, for example, 20 seconds, and re-play only one time for up to 20 seconds. There accordingly exists a need for a recordable plush toy that enables a user to record audio for a relatively short time period such that the recorded audio can be repeatedly played back without having silence between the loops of the audio.

SUMMARY

The present disclosure provides a new and innovative method and apparatus for providing a long playback of a short recording. An example apparatus for long playback of short recordings includes control circuits, a speaker, a microphone, a battery, a play/stop button, a record button, and a memory. The example apparatus is configured to record a sound for a time period using the microphone, store the sound in the memory, and play back the sound using the speaker such that the sound is played back repeatedly in a loop with each iteration of the loop having a duration of the recorded time period Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Embodiments of the present invention include a system and method for long playback of short recordings. A device records a sound (e.g., audio), such as a person's voice, a musical instrument, etc., for a short period time, for example, 20 seconds, and plays that recording back repeatedly, on a loop, for a long period of time. Each iteration of the playback loop is as long as the actual recording so that there are no periods of silence between iterations.

Figure 1:
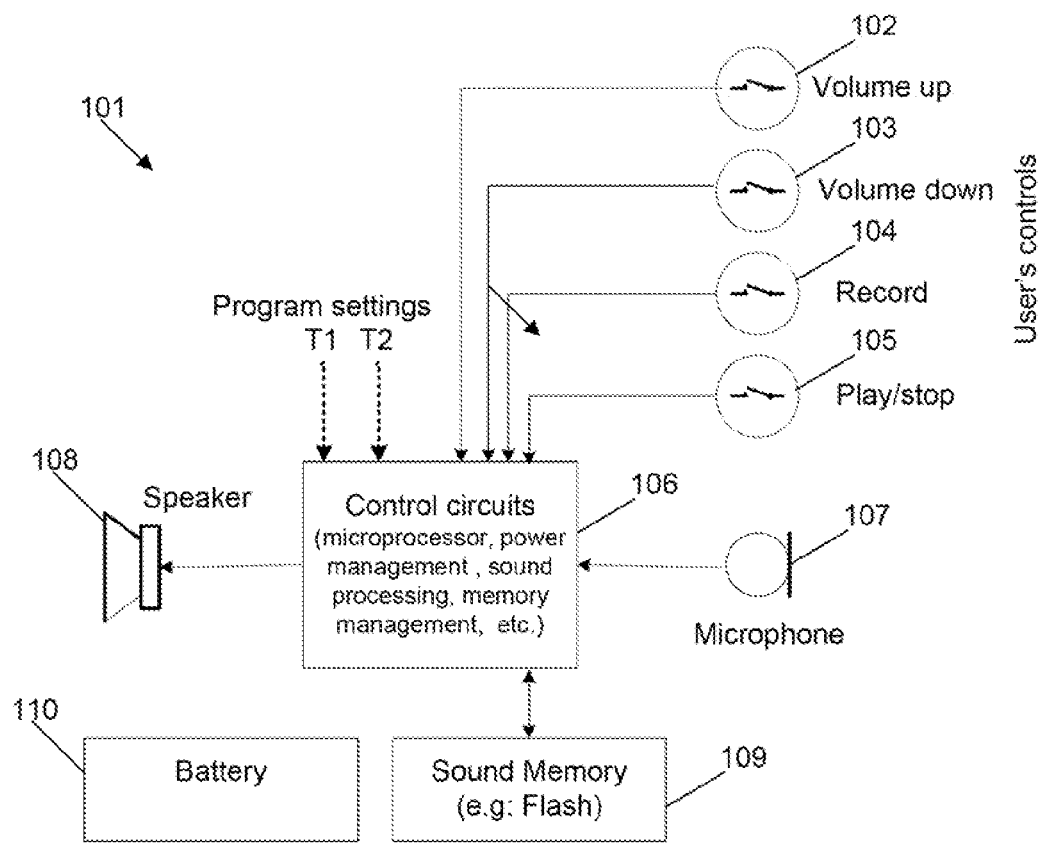
FIG. 1 shows a diagram of an exemplary digital recording device, according to an example embodiment of the present invention.

A digital recording device 101 may be installed into a plush toy. FIG. 1 depicts an exemplary digital recording device 101 for installation in a plush toy. The digital recording device 101 records audio for any length of time up to a maximum of T2 seconds. T2 may be set in the software of the digital recording device 101, and may be, for example, 10, 20, 30, etc. seconds. The digital recording device 101 may then playback the recording for a longer time period, up to T1 minutes. T1 may be set in the software of the digital recording device 101, and may be, for example, 30 minutes or shorter/longer. The playback is the recorded audio being repeated up to the maximum time (T1), or until playback is stopped by a user.

When the digital recording device 101 is installed into a plush toy, wires may be sewn in the plush toy, and the digital recording device 101 may be operated using buttons on the outside of the plush toy. Alternatively, the buttons may be integrated with the plush toy. Buttons used for operating the digital recording device 101 may include a volume up button 102, a volume down button 103, a record button 104, and a play/stop button 105. The digital recording device 101 includes control circuits 106, which may include any suitable microprocessor, power management circuitry, sound processing circuitry, memory management, and other circuitry. The control circuits 106 are connected to a microphone 107, a speaker 108, and a memory module 109. Audio is recorded using the microphone 107 and stored on the memory module 109. The control circuits 106 uses the speaker 108 to play back audio or sounds recorded on the memory module 109. Alternatively, a digital recording from another digital or analog playing device can be stored in the memory of the device 101 via an interface. The digital recording device 101 may be powered by a battery 110. Alternatively, the digital recording device 101 may be powered by a wall outlet.

Figure 2:
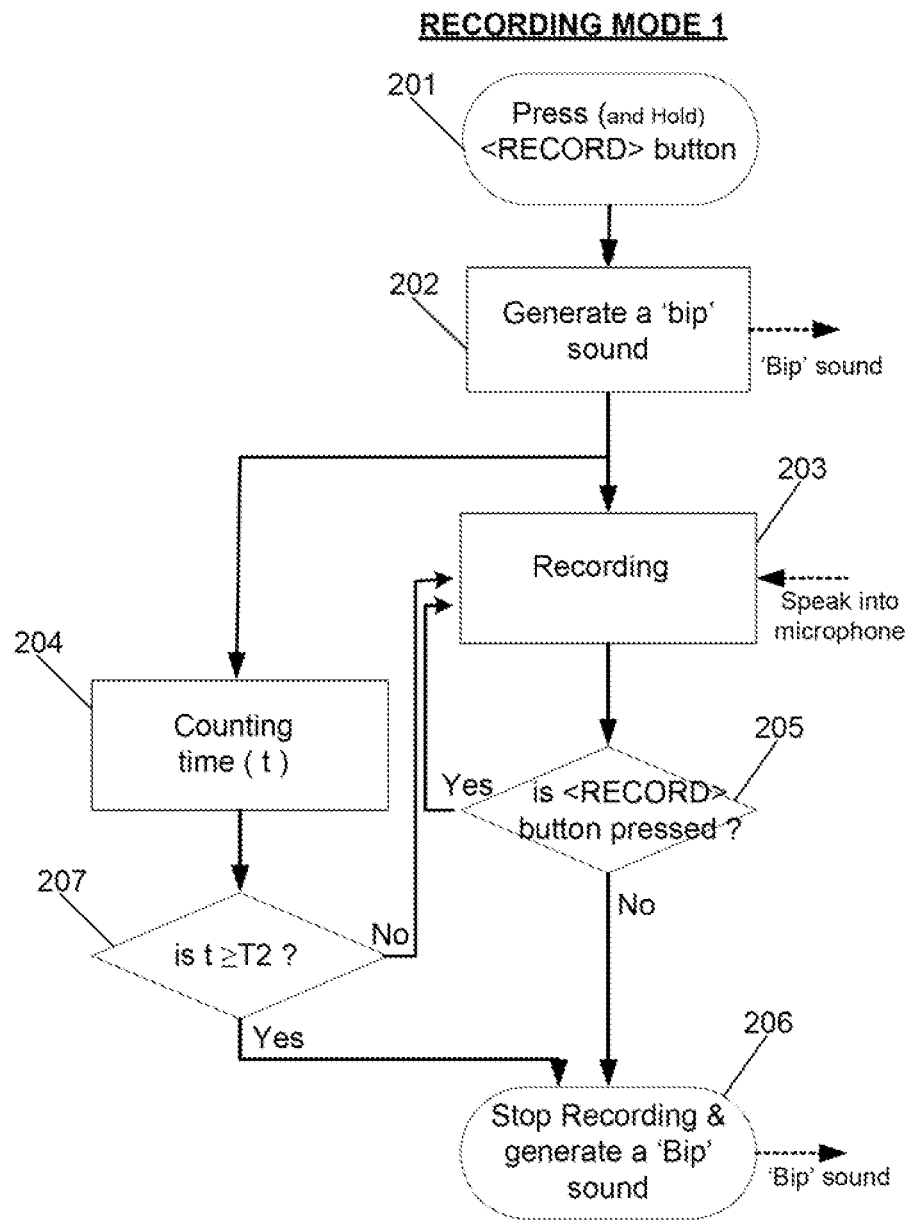
FIGS. 2 and 3 show flowcharts of exemplary procedures for recording audio using the digital recording device of FIG. 1.

FIG. 2 depicts an exemplary procedure for recording. In block 201, a record button is pressed and held down. In block 202, a beep or other sound is generated after the record button has been held down for a certain time period, such as, for example, 3 seconds. The beep or other sound signals the start of recording. This time period between the pushing of the record button and the start of recording may prevent accidental operation of the recording, for example, by a baby using the plush toy, thus erasing previous recording. In block 203, the digital recording device 101 records audio using the microphone. In block 204, a time counter is incremented during the recording. In block 205, if the record button is still held down, flow proceeds back to block 203, where recording of the audio continues. If the record button has been released, flow proceeds to block 206, where the recording of the audio is stopped. In block 207, the time counter is checked. If the time counter has equaled or exceeded the maximum recording length, for example, as set by T2, flow proceeds to block 206, where the recording of the audio is stopped. Otherwise, flow proceeds to block 203, where recording of the audio continues. The recording may be stopped by either block 204 or block 205. In block 206, the recording is stopped, and a beep or other sound may be generated to signal the end of recording.

Figure 3:
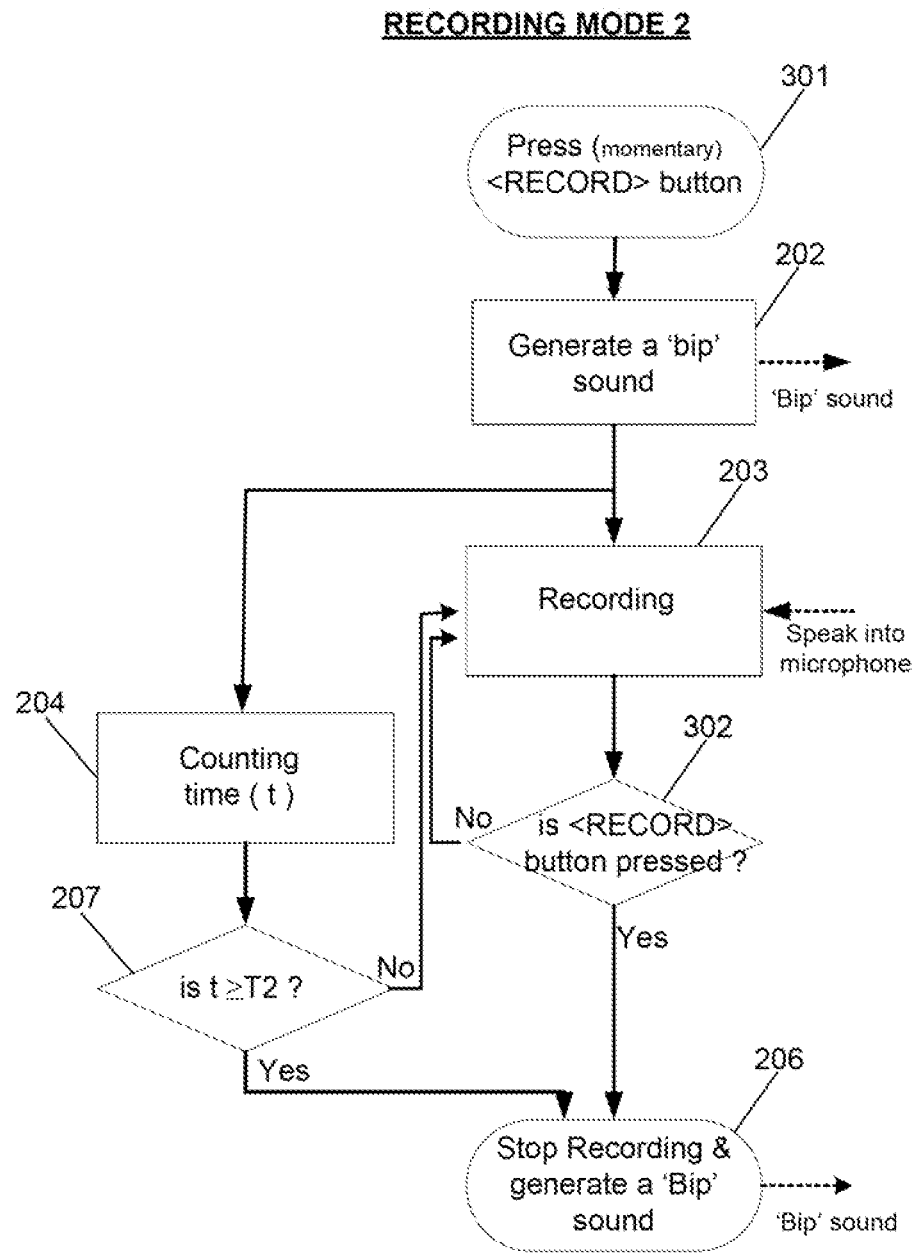

FIG. 3 depicts another exemplary procedure for recording. In block 301, a record button is pressed and released. Blocks 202, 203, 204, 206 and 207 operate as described in conjunction with FIG. 2. In block 302, if the record button is pressed again, flow proceeds to block 206, where the recording of the audio is stopped. Otherwise, flow proceeds back to block 203, and recording continues.

Figure 4:
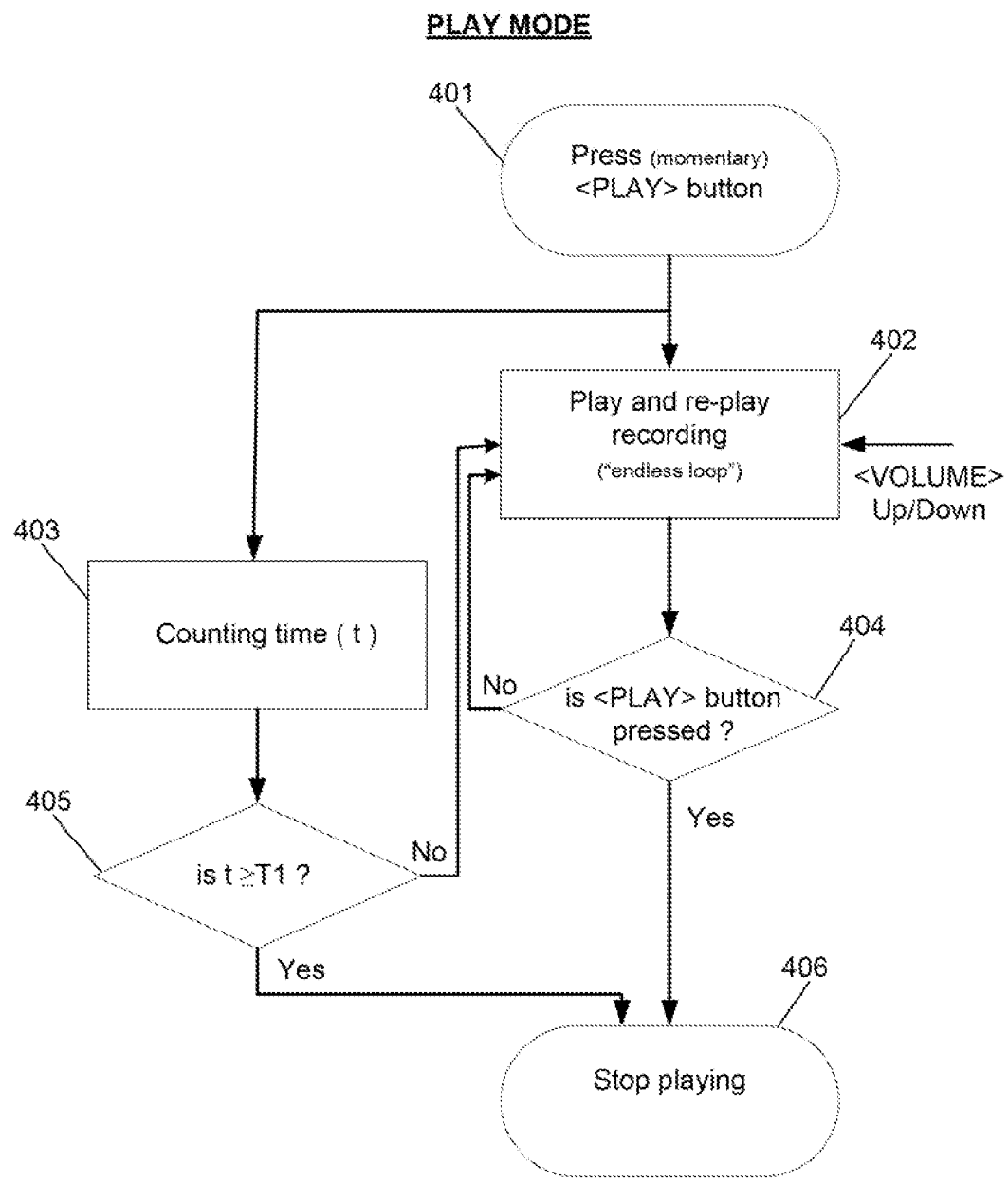
FIG. 4 shows a flowchart of an exemplary procedure for long playback of a short recording using the digital recording device of FIG. 1, according to an example embodiment of the present invention.

FIG. 4 depicts an exemplary procedure for long playback of a short recording. In block 401, a play/stop button is pressed and released. In block 402, the digital recording device 101 plays the recorded audio, for example, as recorded according to the procedures described in conjunction with FIG. 2 or FIG. 3. When the playback reaches the end of the recording, which may be identified by when the recording was stopped, rather than the maximum length allowed for recording, playback may immediately start over from the beginning of the recording. For example, if the maximum recording length is 30 seconds, but the recording is 20 seconds long, and playback proceeds for 10 minutes, then the recording may be played back 30 times instead of 20. In block 403, a time counter is incremented during playback of the recording. In block 404 if the play/stop button has not been pressed and released again, flow proceeds back to block 402, where playback continues. If the play/stop button has been pressed and released, flow proceeds to block 406, thereby stopping the playback of the audio. In block 405, the time counter is checked. If the time counter has equaled or exceeded the maximum playback length, for example, as set by T1, flow proceeds to block 406, stopping the playback of the audio. Otherwise, flow proceeds to block 402, where playback of the audio continues. The playback may be stopped by either block 404 or block 405.

The digital recording device 101 may also use a repetition counter in place of, or in conjunction with the time counter. The repetition counter may be used to count the number of times the recording has been played back. The digital recording device 101 may be set up to stop playback of the recording when the recording has been played back some preset number of times, causing the repetition counter to exceed a maximum preset number of playbacks.

The digital recording device 101 may be used to record any sound, song or voice message without the limitation of a prerecorded background sound. New sounds or messages may be recorded on top of older sounds or messages, thereby replacing them. Alternatively, the digital recording device 101 may remove previously recorded audio prior to recording new audio. In this manner, the digital recording device 101 ensures that no previous audio remains in memory in instances where the new audio has a shorter duration than previously recorded audio.

The digital recording device 101 may operate without external accessories such as, for example, cables or an Internet connection. Alternatively, the digital recording device 101 may include a connection to the Internet and/or a connection to another device. The Internet connection may enable a user to record audio from a website or an application. For instance, remote users may be able to record or otherwise transmit audio for storage in the memory of the digital recording device 101. The connection to another device enables audio to be recorded or received from that device. For instance, a user may transmit or otherwise store computer generated audio to a memory of the digital recording device 101.

The digital recording device 101 may be installed in any suitable item. For example, the digital recording device 101 may be installed in a plush toy, as described, or in plastic toys, mattresses, books, mobiles, and bracelets.

It will be appreciated that all of the disclosed methods described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An apparatus for long playback of short recordings comprising:
   control circuits;
   a speaker;
   a microphone;
   a battery;
   a play/stop button;
   a record button; and
   a memory;
   wherein the apparatus is configured to:
      record a sound for a time period that is less than a maximum recording time using the microphone,
      store the sound in the memory,
      determine a preset period of time,
      determine a total number of repetitions to be played based on the time period of the recorded sound and the preset period of time,
      receive an indication that the sound is to be played back,
      play back the sound for a duration corresponding to the time period using the speaker,
      determine the sound is to be repeated, and
      responsive to determining that the sound is to be repeated, at the end of the duration, playing the sound back for a second duration corresponding to the time period and updating a counter for each play of the sound,
   wherein determining the sound is to be repeated includes determining that the counter is less than the total number of repetitions.

2. The apparatus of claim 1, wherein the sound is played back repeatedly until the expiration of the preset period of time.

3. The apparatus of claim 1, wherein the sound is played back repeatedly for a preset number of repetitions.

4. The apparatus of claim 1, wherein the apparatus is installed in one of a plush toy, a plastic toy, a mattress, a book, a mobile, and a bracelet.

5. The apparatus of claim 1, further comprising a network connection configured to enable the sound to be electronically received from a website or an application.

6. The apparatus of claim 1, further comprising a device connection configured to enable the sound to be electronically received from a user device.

7. A method for long playback of short recordings comprising:
- recording audio for a time period that is less than a maximum recording time;
- receiving an indication of a maximum play time;
- receiving an indication that the audio is to be played back;
- determining a total number of repetitions to be played based on the time period of the recorded audio and the maximum play time;
- playing the audio back for a duration corresponding to the time period;
- determining the audio is to be repeated; and
- responsive to determining that the audio is to be repeated, at the end of the duration, playing the audio back for a second duration corresponding to the time period and updating a counter for each play of the audio,
- wherein determining the audio is to be repeated includes determining that the counter is less than the total number of repetitions.

8. The method of claim 7, further comprising:
- determining a total time that the audio has been repeatedly playing,
- wherein determining the audio is to be repeated includes determining that the total time is less than the maximum play time.

9. The method of claim 8, wherein the maximum play time is specified by a user.

10. The method of claim 8, wherein the maximum play time is preset.

11. The method of claim 7, wherein determining the audio is to be repeated includes determining whether a stop signal has been received.

12. The method of claim 7, wherein the audio played does not include second audio corresponding to a silence time that begins after the time period and ends at the maximum recording time.

13. The method of claim 7, wherein recording the audio includes removing second audio that was previously recorded.

14. The method of claim 7, wherein recording the audio includes receiving the audio from at least one of a website, an application, and a user device.

15. A machine-accessible device having instructions stored thereon that are configured when executed to cause a machine to at least:
- record audio for a time period that is less than a maximum recording time;
- determine a maximum play time;
- receive an indication that the audio is to be played back;
- a total number of repetitions to be played based on the time period of the recorded audio and the maximum play time;
- responsive to detecting a play button has been pressed, play the audio back for a duration corresponding to the time period;
- determined the audio is to be repeated; and
- responsive to determining that the audio is to be repeated, at the end of the duration, play the audio back for a second duration corresponding to the time period and updating a counter,
- wherein determining the audio is to be repeated includes determining that the counter is less than the total number of repetitions.

16. The machine-accessible device of claim 15, further comprising instructions stored thereon that are configured when executed to cause the machine to:
- receive an indication that a record button has been pressed;
- responsive to the record button being pressed for at least a record time period, record the audio; and
- responsive to the record button being released, stop recording the audio.

17. The machine-accessible device of claim 15, wherein the audio is provided from a user at least one of singing or talking.

18. The machine-accessible device of claim 15, wherein the audio is provided from a musical instrument.

19. The machine-accessible device of claim 15, wherein the maximum recording time is 30 seconds.

* * * * *